(12) United States Patent
Wason et al.

(10) Patent No.: US 8,521,901 B2
(45) Date of Patent: Aug. 27, 2013

(54) TCP BURST AVOIDANCE

(75) Inventors: Ashwani Wason, San Jose, CA (US); Nicholas J. Stavrakos, Los Altos, CA (US); Kannan Parthasarathy, Palo Alto, CA (US); Chris Koopmans, Patras (GR)

(73) Assignee: Citrix Systems, Inc., Fort Lauderdale, FL (US)

(*) Notice: Subject to any disclaimer, the term of this patent is extended or adjusted under 35 U.S.C. 154(b) by 525 days.

(21) Appl. No.: 12/341,307

(22) Filed: Dec. 22, 2008

(65) Prior Publication Data

US 2009/0172184 A1 Jul. 2, 2009

Related U.S. Application Data

(60) Provisional application No. 61/017,275, filed on Dec. 28, 2007.

(51) Int. Cl.
*G06F 15/16* (2006.01)
*G01R 31/08* (2006.01)

(52) U.S. Cl.
USPC ......................................... 709/234; 370/230.1

(58) Field of Classification Search
USPC .................................. 709/234; 370/229–240
See application file for complete search history.

(56) References Cited

U.S. PATENT DOCUMENTS

| 6,532,213 | B1* | 3/2003 | Chiussi et al. | 370/230.1 |
|---|---|---|---|---|
| 7,023,799 | B2* | 4/2006 | Takase et al. | 370/230.1 |
| 7,664,028 | B1* | 2/2010 | Gingras et al. | 370/235 |
| 7,782,767 | B1* | 8/2010 | Lin et al. | 370/229 |
| 8,045,456 | B1* | 10/2011 | Kondapalli | 370/229 |
| 2001/0036155 | A1* | 11/2001 | Bauer et al. | 370/230 |
| 2003/0212816 | A1 | 11/2003 | Bender et al. | |
| 2004/0059828 | A1* | 3/2004 | Hooper et al. | 709/238 |
| 2004/0179523 | A1 | 9/2004 | Maruyama et al. | |
| 2004/0213156 | A1* | 10/2004 | Smallwood et al. | 370/232 |
| 2006/0269012 | A1* | 11/2006 | Kim et al. | 375/270 |

(Continued)

FOREIGN PATENT DOCUMENTS

| CN | 1344456 A | 4/2002 |
|---|---|---|
| CN | 1507212 A | 6/2004 |
| CN | 1653761 A | 8/2005 |
| WO | WO 00/21233 A3 | 4/2000 |

OTHER PUBLICATIONS

Amy Hughes et al., "Issues in TCP Slow-Start Restart After Idle", IETF Standard Working Draft, Internet Engineering Task Force, IETF, vol. tcpimpl. Mar. 30, 1998, 7 pages.

(Continued)

*Primary Examiner* — Joseph Avellino
*Assistant Examiner* — James Conaway
(74) *Attorney, Agent, or Firm* — Finnegan, Henderson, Farabow, Garrett & Dunner LLP

(57) ABSTRACT

A computer-implemented method including providing, at a first device, a packet scheduler layer between a network layer and a transport layer; receiving, at the packet scheduler layer, one or more transmission control protocol (TCP) packets from a sending layer on the first device, wherein the sending layer is one of the network layer or the transport layer; smoothing delivery of at least one of the one or more TCP packets by delaying the delivery; and sending the one or more TCP packets to a receiving layer, wherein the receiving layer is one of the network layer or the transport layer that is not the sending layer.

38 Claims, 9 Drawing Sheets

(56) References Cited

U.S. PATENT DOCUMENTS

2007/0091894 A1* 4/2007 Kang et al. .................. 370/394
2007/0195773 A1* 8/2007 Tatar et al. .................. 370/392
2008/0112318 A1* 5/2008 Groleau et al. ............ 370/230.1

OTHER PUBLICATIONS

International Search Report and Written Opinion of the International Searching Authority for International Application No. PCT/US2008/014027, mailed Apr. 17, 2009, 14 pages.

International Preliminary Report on Patentability and Written Opinion of the International Searching Authority mailed Jul. 8, 2010, for International Application No. PCT/US2008/014027, 8 pages.

State Intellectual Property Office of People's Republic of China Search Report issued Sep. 20, 2012, for Chinese Application No. 200880127690.X, 13 pages.

European Patent Office Communication under Rule 71(3) EPC for European Application No. 08868107.7, mailed Jan. 25, 2013, 43 pages.

State Intellectual Property Office of People's Republic of China Second Office Action issued Apr. 11, 2013, for Chinese Application No. 200880127690.X, 17 pages.

\* cited by examiner

TCP BURST AVOIDANCE

CROSS REFERENCE TO RELATED PATENTS

This application claims the benefit of U.S. Provisional Application No. 61/017,275, filed Dec. 28, 2007, titled "TCP Packet Spacing," which is incorporated herein by reference.

BACKGROUND INFORMATION

Packet bursts are a common issue in today's high speed wireless data networks such as High-Speed Downlink Packet Access (HSDPA) and result from the way such networks are implemented. A TCP server or proxy sending data to a mobile client over a wireless data network can receive sudden bursts of TCP acknowledgement packets. These bursts are caused by buffering TCP acknowledgement packets in the uplink path. Buffering of TCP acknowledgment packets is a side effect of the way high speed data networks are implemented and is required primarily to maintain the order while delivering TCP packets. Such bursts of TCP acknowledgment packets can also be caused by radio channel fading. Radio channel fading is due to a number of reasons, such as atmospheric interference, distance between the mobile unit and the cell tower transceivers, and so on.

In reaction to a burst of TCP acknowledgements, a TCP server typically sends a burst of data packets to the mobile client in order to fill up the congestion window as defined by the TCP protocol. In most cases, it is desirable to have the server send data as fast as possible to the client in order to use the full channel bandwidth. Nodes in the Wireless Packet Core Network, however, are typically not designed to handle bursty transmissions and frequently drop packets when a burst of TCP/IP packets are received in a short interval of time.

A TCP server assumes that a packet is lost if the acknowledgement from the client is not received within a configured time interval, or if it receives one or more duplicate acknowledgements from the client. In either case, the server has to re-transmit the lost packets and this triggers TCP's slow start and congestion avoidance algorithms. The end result is that the full channel bandwidth is not utilized. The inefficient use of the available wireless channel bandwidth is particularly common when a large amount of data is transferred from a server to a mobile client. For example, this problem would be common during large file downloads using HTTP or FTP.

A large burst of TCP acknowledgement packets from the mobile client immediately following network fade triggers a burst of data packets from the TCP server. As stated above, a large data packet burst from the TCP server usually results in undesirable packet loss and inefficient use of the wireless data channel.

DESCRIPTION OF THE EMBODIMENTS

Reference will now be made in detail to the exemplary embodiments implemented according to the TCP Packet Spacing, the examples of which are illustrated in the accompanying drawings. Wherever possible, the same reference numbers will be used throughout the drawings to refer to the same or like parts.

The following embodiments describe the ability to handle TCP Packet bursts in Wireless Data Networks or any data networks. When this solution is used, bursts of TCP acknowledgement packets received from client devices, e.g., mobile clients, and bursts of data packets sent to the client devices are smoothed, thus minimizing packet loss. In some embodiments, the TCP Packet Spacing is implemented on an Optimization Services Node (OSN), such as a Bytemobile's OSN. Further, in some embodiments, the TCP Packet Spacing can be implemented on any TCP server, content server, or client device. The TCP Packet Spacing can minimize undesirable packet loss in wireless or in any data network, resulting in efficient use of the available bandwidth in the wireless or any data channel.

Figure 1:
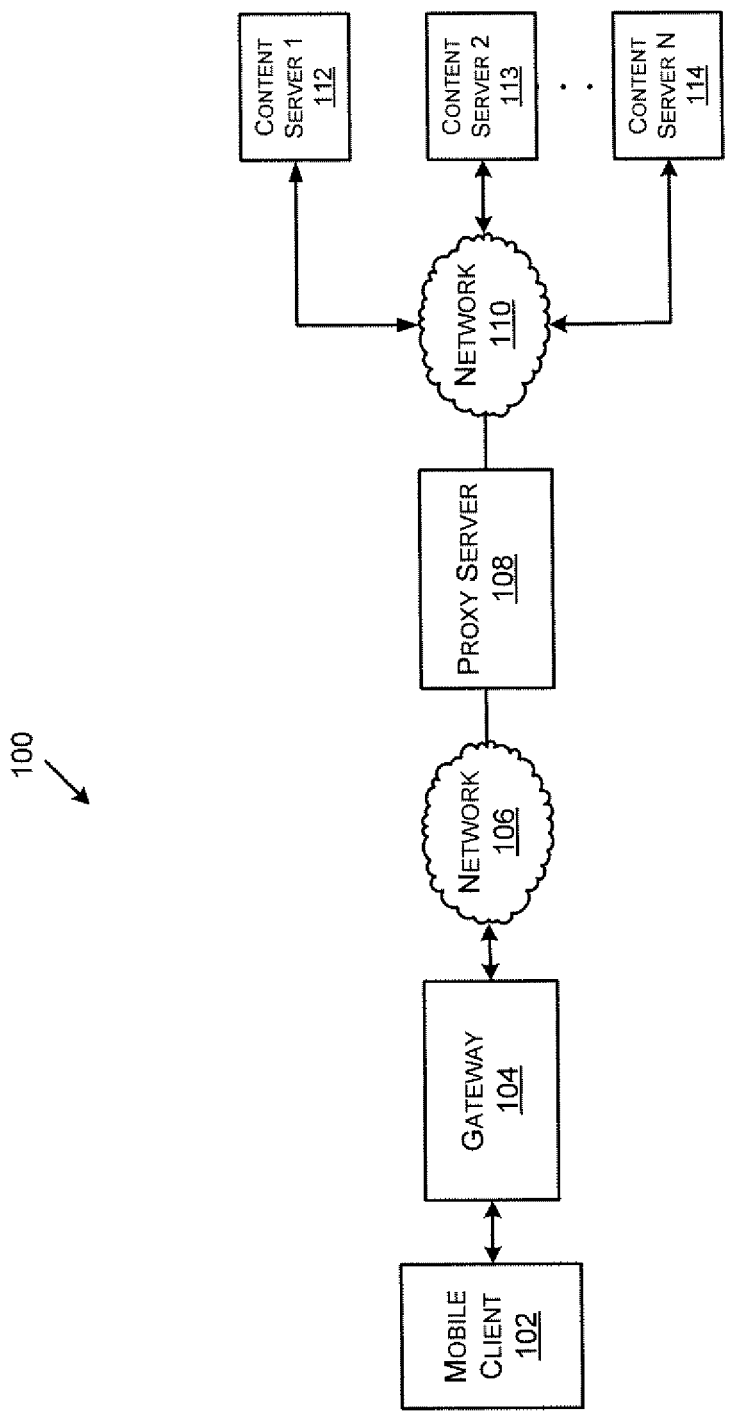
FIG. 1 is a block diagram of an exemplary system.

FIG. 1 is a block diagram of an exemplary system. Exemplary system 100 can be any type of system that transmits data packets over a network, such as a wireless network, Internet, etc. For example, the exemplary system can include a mobile client receiving data packets from content servers through the Internet. The exemplary system can include, among other things, a mobile client 102, a gateway 104, one or more networks 106, 110, a proxy server 108, and one or more content servers 112-114.

Mobile client 102 is an exemplary client device, which is a hardware component, such as a computer, a PDA, a cell phone, a laptop, a desktop, or any device accessing a data network, including software applications that allow the device to communicate with and receive data packets from the data network. Mobile client 102 provides one or more software applications, such as a web browser, a search engine crawler, a screen reader, a media player, or a Braille browser. Further, mobile client 102 has the capability of requesting and receiving data packets, such as data packets of streaming media, from the Internet. For example, mobile client 102 can send request data to content servers 112-114 for a particular file or object data of a web page by its URL, and the content server of the web page can query the object data in a database and can send back the object data as part of the response data (e.g., HTTP/WAP response data) to mobile client 102. In some embodiments, response data may be routed through proxy server 108.

Gateway 104 is one or more devices that serves as an entrance or a means of access and may or may not convert formatted data provided in one type of network to a particular format required for another type of network. Gateway 104, for example, may be a server, a router, a firewall server, a host, or a proxy server. Gateway 104 has the ability to transform the signals received from mobile client 102 into signals that network 106 can understand and vice versa. However, this transforming ability is not required in some data networks, for example, Fourth-Generation (4G) or Worldwide Interoperability for Microwave Access (WiMAX). Gateway 104 may be capable of processing audio, video, and T.120 transmissions alone or in any combination, and is capable of full duplex media translations.

Networks 106 and 110 can include any combination of wide area networks (WANs), local area networks (LANs), or wireless networks suitable for packet-type communications, such as Internet communications. Further, networks 106 and 110 can include a packet scheduler to smooth bursts of TCP packets.

Proxy server 108 can act as a TCP server that provides communication between gateway 104 and content servers 112-114. Proxy server 108 can provide a packet scheduler for smoothing TCP packet bursts received from or sent to mobile client 102. The packet scheduler is further described below.

Content servers 112-114 are servers that receive the request data from mobile client 102, process the request data accordingly, and return the response data back to mobile client 102 through, in some embodiments, proxy server 108. For example, content servers 112-114 can be a web server, an enterprise server, or any other type of server. Content servers 112-114 can be a computer or a computer program responsible for accepting requests (e.g., HTTP, RTSP, or other protocols that can initiate a media session) from mobile client 102 and for serving mobile client 102 with streaming media. In some embodiments, content servers 112-114 can include a packet scheduler to smooth bursts of TCP packets.

Figure 2A:
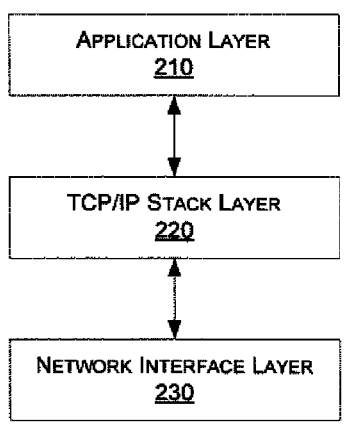
FIG. 2A is a simplified view of TCP/IP packet processing at a computer device.

FIG. 2A is a simplified view of TCP/IP packet processing at a computer device. According to functionalities, a network architecture on a host or a server can be divided into different layers. For example, the Open Systems Interconnection Basic Reference Model (OSI Model) divides the network architecture into seven layers, which include the physical layer, the data link layer (which can further include the logical link control (LLC) sublayer and the media access control (MAC) sublayer), network layer, transport layer, session layer, presentation layer, and application layer. In the real world, however, protocol stacks can combine one or more of the OSI layers into a single layer to work together to allow software or hardware to perform a function. As a result, one of ordinary skill in the art appreciates that one or more layers described below can be combined into a single layer.

FIG. 2A illustrates a network architecture of three layers which, from top to bottom, are Application Layer 210, TCP/IP Stack Layer 220, and Network Interface Layer 230. The functionality and data encapsulation at each of these layers are well known in the art and thus will not be described in detail here. The description below focus on TCP/IP packet processing.

Application Layer 210 is the topmost layer that comprises, among other things, data transfer protocols such as HTTP, Telnet and FTP, and software applications such as a Web server or a HTTP proxy. Application Layer 210 can send data to or receives data from peer machines or the Internet.

When sending the data to the peer machines or the Internet, Application Layer 210 can transfer the data to TCP/IP Stack Layer 220 either directly or through one or more other layers. In turn, TCP/IP Stack Layer 220, which is the middle layer responsible for TCP/IP processing, moves the data to Network Interface Layer 230 in conformance with standard TCP flow control semantics. In some embodiments, TCP/IP Stack Layer 220 may include, among other things, the transport layer of the OSI Model layers.

Network Interface Layer 230 is the bottommost layer in this figure. For example, in Ethernet networks, the driver for the Network Interface Card that connects the server to an Ethernet network would constitute this layer. Network Interface Layer 230 connects hosts or nodes in the network and transmits the data to a destination.

When receiving data packets from the peer machines or the Internet, it is Network Interface Layer 230 that first receives and processes the data packets, and then transfers to TCP/IP Stack Layer 220 as fast as possible. TCP/IP Stack Layer 220 in turn processes the received packets and, if necessary, signals the application. After processing, TCP/IP Stack Layer 220 transfers the received data to Application Layer 210.

In some embodiments, packets, such as TCP acknowledgement packets or re-transmission of lost data packets, can be transmitted by TCP/IP Stack Layer 220 even when there is no data received. In the case of providing data to the peer machines or the Internet, Application Layer 210, such as a web server sends a burst of data to the TCP layer faster than the TCP layer can send out. The TCP layer buffers the data it can not send. Upon receiving a burst of TCP acknowledgement packets from Network Interface Layer 230, the TCP/IP Stack Layer 220 sends a burst of data packets down to the Network Interface Layer 230. Also, if the acknowledgement from the peer machines or the Internet is not received within a configured time interval, or one or more duplicate acknowledgements are received, TCP/IP Stack Layer 220 assumes that packets are lost and re-transmits the lost packets. As a result, the instantaneous data rates can be very high and exceed the handling capabilities of nodes in the wireless data network resulting in undesirable packet loss and inefficient use of the wireless data channel.

Figure 2B:
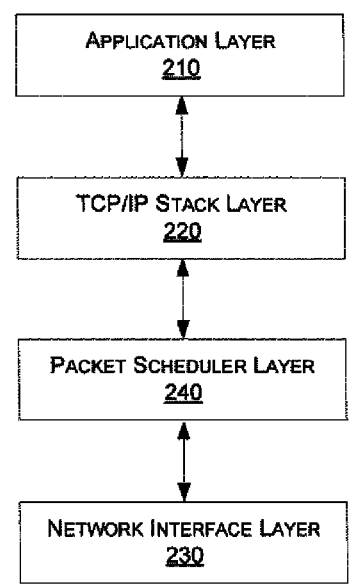
FIG. 2B is an exemplary view of TCP/IP packet processing with a Packet Scheduler.

FIG. 2B is an exemplary view of TCP/IP packet processing with a Packet Scheduler Layer 240. In order to gracefully handle bursts of TCP Acknowledgement packets from the peer machines or the Internet, the TCP Packet Spacing introduces a new logical layer for packet processing. The new processing layer is referred to as Packet Scheduler Layer 240. Packet Scheduler Layer 240 is located in-between TCP/IP Stack Layer 220 and Network Interface Layer 230. Packet Scheduler Layer 240 processes both incoming packets from Network Interface Layer 230 as well as outgoing packets to Network Interface Layer 230.

TCP/IP packet processing with a Packet Scheduler can be used in a proxy server, adopting a TCP optimization technology such as the Bytemobile TCP Optimization technology. The proxy server splits the TCP connection between a mobile client and a content server and changes behavior of TCP on the wireless side of the network. The proxy server avoids sending a large packet burst to the mobile client even when a large burst of TCP acknowledgement packets are received from the mobile client. By utilizing this approach, TCP data packets to the mobile client may be transmitted in a smoother fashion, thus minimizing packet loss.

In some embodiments, the embodiments provided in FIG. 2B can include the Packet Scheduler Layer 240 in a mobile device or one or more of content servers 112-114.

Figure 3:
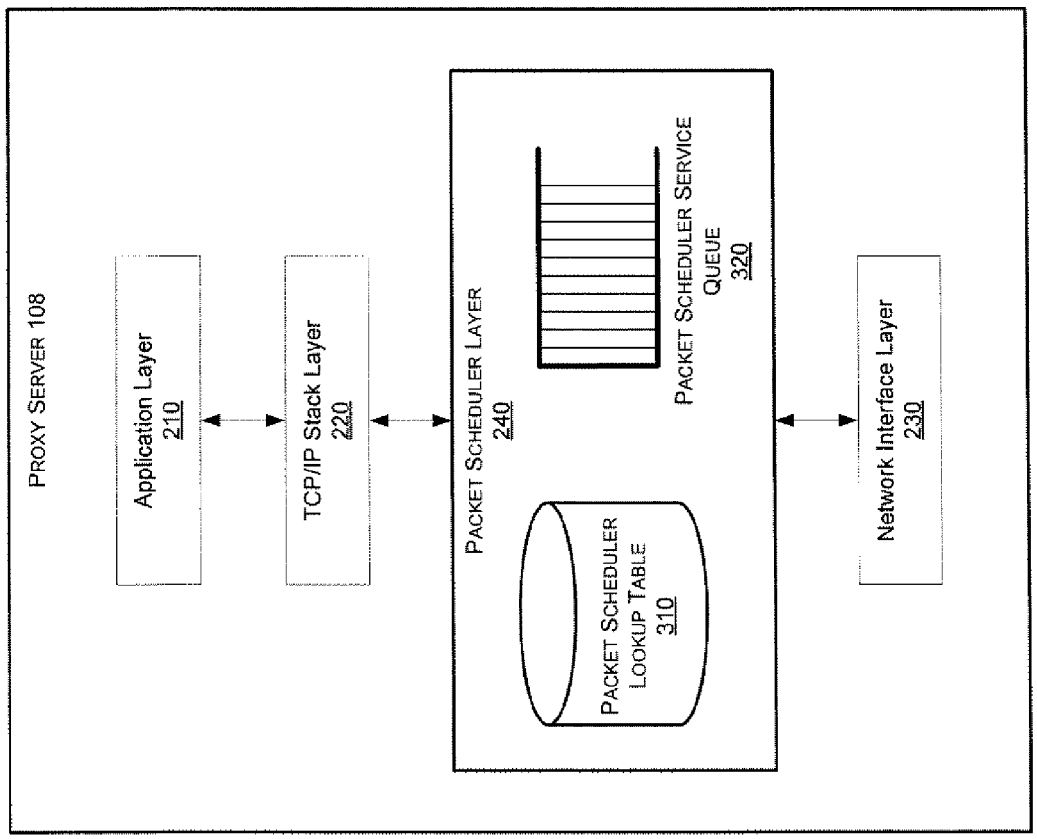
FIG. 3 is a block diagram illustrating an embodiment of the exemplary system of FIG. 1.

FIG. 3 is a block diagram illustrating an embodiment of the exemplary system of FIG. 1. Mobile client 102 is a wireless device that can include, among other things, software applications that allow mobile client 102 to communicate with and receive data packets from proxy server 108, which obtains data packets from one or more of content servers 112-114. Proxy server 108 may include, among other things, an Application Layer 210, a TCP/IP Stack Layer 220, a Packet Scheduler 240, and a Network Interface Layer 230. Packet Scheduler Layer 240 may include, among other things, a Packet Scheduler Lookup Table 310 and a Packet Scheduler Service Queue 320.

Packet Scheduler Lookup Table 310 stores information for each TCP connection. The information stored includes the following:

a. A per-connection first-in-first-out (FIFO) queue that has pointers to the packets which are yet to be delivered to the upstream TCP/IP Stack Layer 220 or to the downstream Network Interface Layer 230. In some embodiments, the FIFO queue may be setup for multiple connections for the same user or even all connections for a group of users.

b. A timestamp when the last packet was delivered to upstream TCP/IP Stack Layer 220 or to downstream Network Interface Layer 230. This is referred to as the Last Delivery Time (LDT).

c. A number of packets in the current set that has been delivered to upstream TCP/IP Stack Layer 220 or to downstream Network Interface Layer 230 without any additional delays. This is referred to as the Burst Count (BC).

In some embodiments, Packet Scheduler Lookup Table 310 can be implemented in a computer cache.

Packet Scheduler Service Queue 320 can be a single queue that stores pointers to packets that need to be serviced/processed by the Packet Scheduler Layer 240. In some embodiments, Packet Scheduler Service Queue 320 can be a buffer storing packets for servicing/processing by the Packet Scheduler Layer 240. Packet Scheduler Service Queue 320 can be implemented in a computer cache.

In some embodiments, Packet Scheduler Layer 240 can maintain separate instances of Packet Scheduler Lookup Table 310 and Packet Scheduler Service Queue 320 for handling incoming and outgoing packets. By maintaining separate instances of Packet Scheduler Lookup Table 310 and Packet Scheduler Service Queue 320, delayed delivery of packets may be enabled simultaneously for both incoming and outgoing packets. In practice, it might suffice to enable delayed delivery in one direction.

Further, Packet Scheduler Layer 240 can include buffers for storing packets prior to transmitting them to their intended destination.

Figure 4:
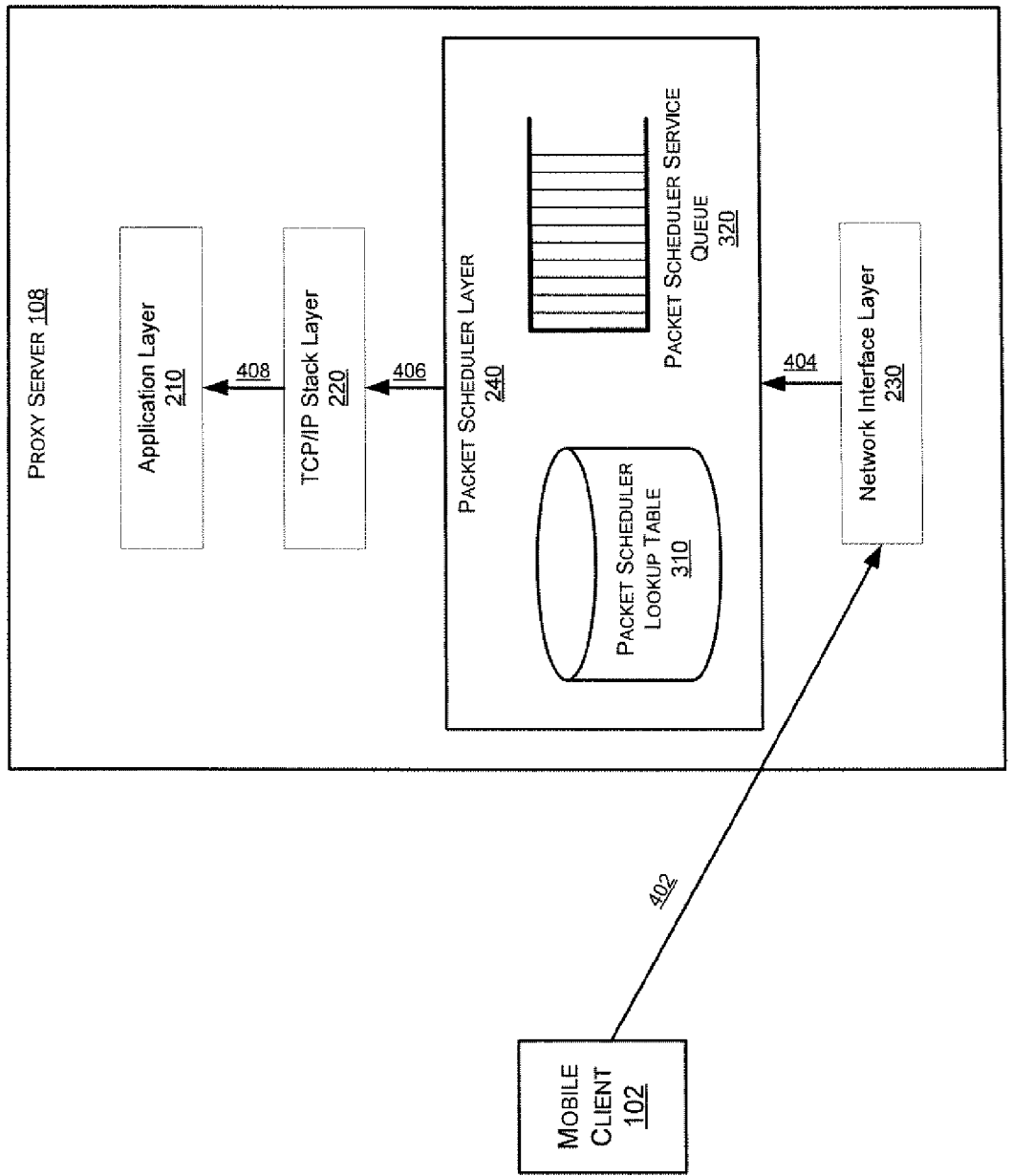
FIG. 4 is a functional diagram illustrating an exemplary communication flow for processing incoming packets in the exemplary system of FIG. 3.

FIG. 4 is a functional diagram illustrating an exemplary communication flow for processing incoming packets in the exemplary system of FIG. 3. Incoming packet are those received at a Packet Scheduler such as Packet Scheduler Layer 240 from the downstream Network Interface Layer such as Network Interface Layer 230 to be delivered to an upstream TCP/IP Stack Layer such as TCP/IP Stack Layer 220.

Mobile client 102 establishes a TCP connection and sends (402) a TCP packet to proxy server 108. Within proxy server 108, after receiving the TCP packet, Network Interface Layer 230 transmits (404) the packet to Packet Scheduler Layer 240. Packet Scheduler Layer 240 determines whether the TCP packet is eligible for packet scheduling service by checking, for example, whether the TCP packet is a TCP Acknowledgement packet. If the TCP packet is not eligible for packet scheduling service, for example, the TCP packet is not a TCP Acknowledgement, then Packet Scheduler Layer 240 delivers (406) the TCP packet to upstream TCP/IP Stack Layer 220, which processes the TCP packet and in turn sends the processed packet to Application Layer 210.

If the TCP packet is eligible for packet scheduling service, for example, the TCP packet is not a TCP Acknowledgement, then Packet Scheduler Layer 240 buffers the packet for later delivery. Also, Packet Scheduler Layer 240 stores information about this TCP connection in Packet Scheduler Lookup Table 310, and stores a pointer to the packet in Packet Scheduler Service Queue 320 for later processing. As stated above, the information about the TCP connection can include, among other things, a per-connection FIFO queue that has pointers to the packets which are yet to be delivered to the upstream TCP/IP Stack Layer 220, a Last Delivery Time (LDT), and a Burst Count (BC). In some embodiments, Packet Scheduler Layer 240 stores the packet itself in Packet Scheduler Service Queue 320 for later processing. The details for processing incoming packets received from the downstream Network Interface Layer 230 is further discussed below.

Figure 5:
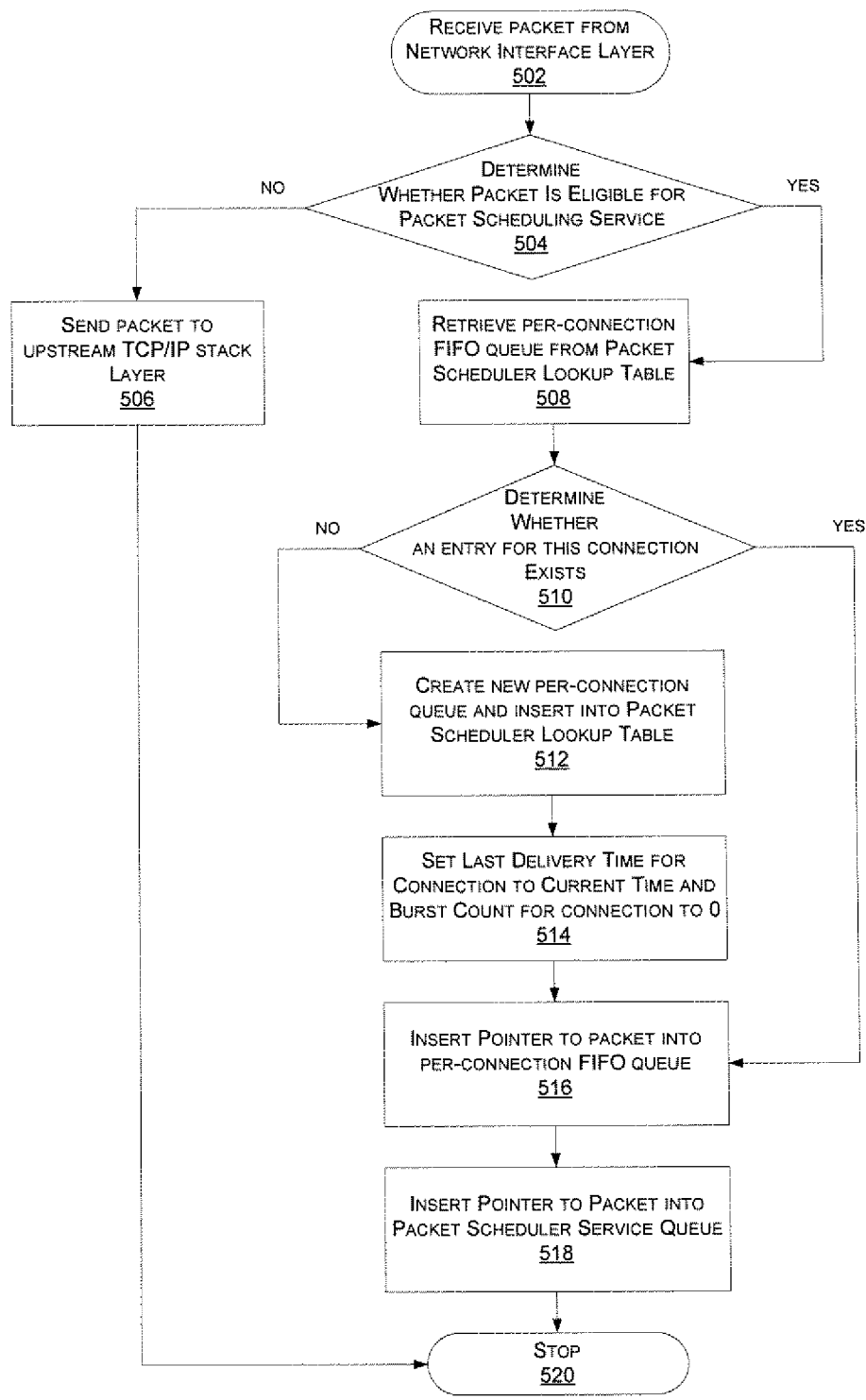
FIG. 5 is a flowchart representing an exemplary method for processing incoming packets.

FIG. 5 is a flowchart representing an exemplary method for processing incoming packets. It will be readily appreciated by one of ordinary skill in the art that the illustrated procedure can be altered to delete steps or further include additional steps.

After receiving (502) a TCP packet from the Network Interface Layer, a Packet Scheduler Layer determines (504) whether the TCP packet is eligible for packet scheduling service, for example, by checking whether the TCP packet is a TCP Acknowledgement packet. The TCP flags and other properties corresponding to the packet are used to check eligibility of the packet for the packet scheduling service. The rules to check eligibility can be quite general A simple and useful rule is to determine if the TCP ACK (acknowledgement) flag is set while the URG (urgent), RST (reset), SYN (synchronize), and FIN (finished) flags are not set.

If the packet is not eligible for the packet scheduling service, for example, the packet is not a TCP Acknowledgement packet, then the Packet Scheduler Layer can forward (506) the packet to the upstream TCP/IP Stack Layer. The process for this packet can then stop (520).

If the packet is eligible for the packet scheduling service, the Packet Scheduler Layer retrieves (508) per-connection FIFO queue from an internal Packet Scheduler Lookup Table, and determines (510) if an entry already exists for the TCP connection. In some embodiments, the packet scheduler lookup table provides a FIFO queue that corresponds to a single connection. In some embodiments, the Packet Scheduler Lookup Table provides a FIFO queue that corresponds to multiple connections.

If an entry exists for the connection that is processed by the Packet Scheduler Layer, the Packet Scheduler Layer skips the following several steps, and inserts (516) a pointer to the packet into the per-connection FIFO queue stored in the Packet Scheduler Lookup Table, for later processing. If no entry exists for the connection, then the Packet Scheduler Layer creates (512) a new per-connection FIFO queue corresponding to this TCP connection and inserts the queue (512) into the Packet Scheduler Lookup Table. The Last Delivery Time (LDT) is set (514) to current time and the Burst Count (BC) is set (514) to zero. The Last Delivery Time and the Burst Count are stored into the Packet Scheduler Lookup Table. The Last Delivery Time and the Burst Count will be updated and used for processing and delivering incoming packets to the upstream TCP/IP stack layer. The details are further discussed below. After that, a pointer to the packet is inserted (516) into the per-connection FIFO queue stored in the Packet Scheduler Lookup Table.

Lastly, a pointer to the packet is also inserted (518) into the Packet Scheduler Service Queue, used by the Packet Scheduler Layer to process the pointed packets. In some embodiments, the packet itself is inserted (518) into the Packet Scheduler Service Queue for later processing. The process can then stop (520).

Figure 6:
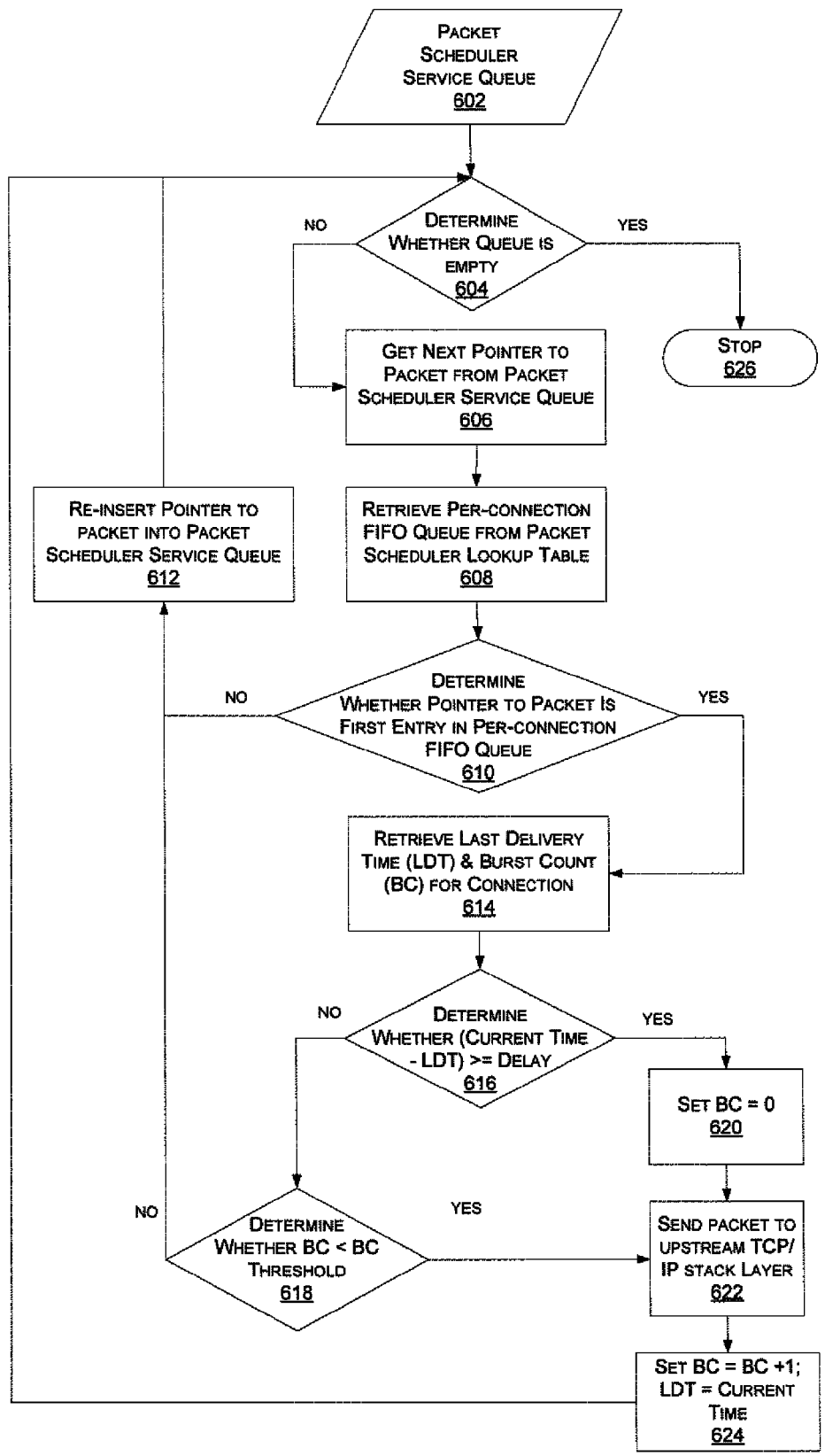
FIG. 6 is a flowchart representing an exemplary method for processing, in a packet scheduler, incoming packets.

FIG. 6 is a flowchart representing an exemplary method for processing, in a Packet Scheduler Layer, incoming packets. It will be readily appreciated by one of ordinary skill in the art that the illustrated procedure can be altered to delete steps or further include additional steps. Processing entries in a Packet Scheduler Service Queue and handling packets received from a Network Interface Layer can happen in different execution contexts.

The Packet Scheduler Layer can invoke (602) a Packet Scheduler Service Routine to process entries in the Packet Scheduler Service Queue, through a trigger, e.g., a packet received from the Network Interface Layer or a timer that fires after a period of inactivity. The Packet Scheduler Layer first checks to determine (604) if there are any entries to be processed in the Packet Scheduler Service Queue. If the Packet Scheduler Service Queue is empty, then the Packet Scheduler Service Routine terminates (626). If the Packet Scheduler Service Queue is not empty, the Packet Scheduler Layer retrieves (606) the first entry (next pointer to a packet in some embodiments, and a packet in other embodiments) from the queue. The Packet Scheduler Layer also retrieves (608) from the Packet Scheduler Lookup Table information, for example, per-connection FIFO Queue, a Last Delivery Time, and a Burst Count, pertaining to the connection.

As noted earlier, for example, in FIG. 5 above, the Packet Scheduler Lookup Table stores a per-connection FIFO queue which has pointers to packets that have been buffered at the Packet Scheduler Layer. The Packet Scheduler Layer determines (610) whether the current packet being processed is the first entry in the per-connection FIFO queue, If the current packet is not the first packet in the per-connection FIFO queue, the current packet is simply put back (612) in the Packet Scheduler Service Queue for later processing and the method would proceed back to step 604 once again. This ensures that the packet ordering is maintained for a given connection.

If packet is the first packet in the per-connection FIFO queue, then the Packet Scheduler Layer retrieves (614) the Last Delivery Time (LDT) and the Burst Count (BC) for that connection from the Packet Scheduler Lookup Table. The Packet Scheduler Layer computes the time interval between the current time and the Last Delivery Time for that connection and checks (616) against a pre-configured delay time, set automatically by the system or set by an administrator.

If the time interval is less than the pre-configured delay time, then this packet is a candidate for delayed delivery to the upstream TCP/IP Stack Layer. In this case, the Packet Scheduler Layer checks (618) the Burst Count for this connection against a pre-configured burst count threshold, set automatically by the system or set by an administrator. This burst count threshold is a value that is perceived to be the maximum value for communicating packets without receiving packet loss. The burst count threshold could be based on stored historical data. If the Burst Count is less than the pre-configured burst count threshold, the Packet Scheduler Layer delivers (622) the packet to the upstream TCP/IP Stack Layer. Then, the Packet Scheduler Layer updates (624) the Last Delivery Time to be equal to the current time and increments (624) the Burst Count by one. Incrementing the Burst Count will eventually make the Burst Count reach the pre-configured burst count threshold in subsequent rounds of processing for this particular connection (e.g., the exchange of packets between two devices during a communication session); thus the packets are delivered (622) to the upstream TCP/IP Stack Layer. After set step 624, the method proceeds to step 604. If the Burst Count is greater than the pre-configured burst count threshold, then the Packet Scheduler Layer delays delivering the packet to the upstream TCP/IP Stack Layer by simply re-inserting (612) the pointer to the packet into the Packet Scheduler Service Queue, and keeping the packet in the buffer in the Packet Scheduler Layer. In some embodiments, the packet itself is re-inserted (612) into the Packet Scheduler Service Queue for later processing.

If the time interval between the current time and the Last Delivery Time for that connection is greater than or equal to the pre-configured delay threshold, the Packet Scheduler Layer sets (620) the Burst Count for the connection to zero and delivers (622) the packet to the upstream TCP/IP Stack Layer. Then, the Packet Scheduler Layer updates (624) the Last Delivery Time to be equal to the current time and increments (624) the Burst Count by one. Processing continues by starting from step 604 once again.

Figure 7:
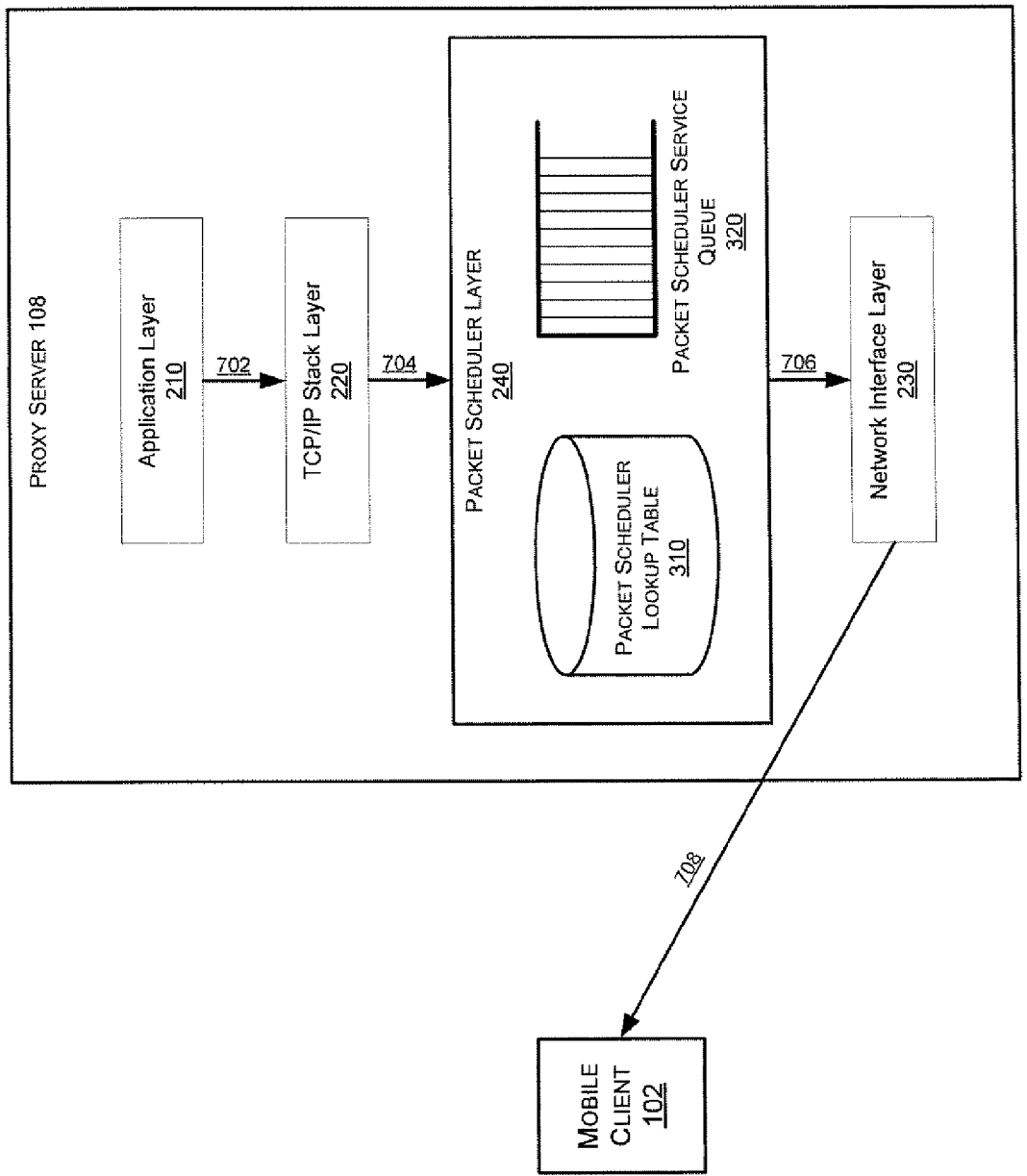
FIG. 7 is a functional diagram illustrating an exemplary communication flow for processing outgoing packets in the exemplary system of FIG. 3.

FIG. 7 is a functional diagram illustrating an exemplary communication flow for processing outgoing packets in the exemplary system of FIG. 3. Outgoing packets are those that are sent from a TCP/IP Stack Layer such as Packet Scheduler Layer 240 to a downstream Network Interface Layer such as Network Interface Layer 230 to be eventually delivered to an intended client. The processing of outgoing packets in Packet Scheduler Layer 240 may be similar to the processing of incoming packets as described above in FIGS. 4-6. When outgoing packets are processed by Packet Scheduler Layer 240, however, the roles of Network Interface Layer 230 and TCP/IP Stack Layer 220 are reversed. Other differences may include, but are not limited to, the rules used to check the eligibility of a packet for delayed delivery via the Packet Scheduler service. While the rules can be arbitrary, delaying TCP ACK packets may be useful in practice for incoming packets since TCP ACK bursts are a common problem in wireless networks. For outgoing packets, it may be useful to delay TCP data packets so that packet bursts and resulting packet loss can be minimized.

As stated above, in some embodiments, Packet Scheduler Layer 240 can maintain an instance of Packet Scheduler Lookup Table 310 and Packet Scheduler Service Queue 320 for handling incoming packets, and maintain another instances of Packet Scheduler Lookup Table 310 and Packet Scheduler Service Queue 320 for handling outgoing packets. By maintaining separate instances of Packet Scheduler Lookup Table 310 and Packet Scheduler Service Queue 320 for incoming and outgoing packets, delayed delivery of packets may be enabled simultaneously for both incoming and outgoing packets.

On proxy server 108, Application Layer 210 sends (702) data to TCP/IP Stack Layer 220, which packetizes the data and sends (704) one of TCP packets to the Packet Scheduler Layer 240. Packet Scheduler Layer 240 determines whether the TCP packet is eligible for packet scheduling service, for example, by checking whether the TCP packet is a data packet or not. If the TCP packet is not eligible for packet scheduling service, for example, when the TCP packet is not a data packet, then Packet Scheduler Layer 240 delivers (706) the TCP packet to the downstream Network Interface Layer 230, which eventually sends (708) the packet to mobile client 102.

If the TCP packet is eligible for packet scheduling service, for example, when the TCP packet is a data packet, Packet Scheduler Layer 240 buffers the packet for later delivery. Also, Packet Scheduler Layer 240 stores information about this TCP connection in Packet Scheduler Lookup Table 310, and stores a pointer to the packet in Packet Scheduler Service Queue 320 for later processing. As stated above, the information about the TCP connection can include, among other things, a per-connection FIFO queue that has pointers to the packets which are yet to be delivered to the downstream Network Interface Layer 230, a Last Delivery Time (LDT), and a Burst Count (BC). In some embodiments, Packet Scheduler Layer 240 stores the packet itself in Packet Scheduler Service Queue 320 for later processing. The details for processing outgoing packets received from upstream TCP/IP Stack Layer 220 is further discussed below.

Figure 8:
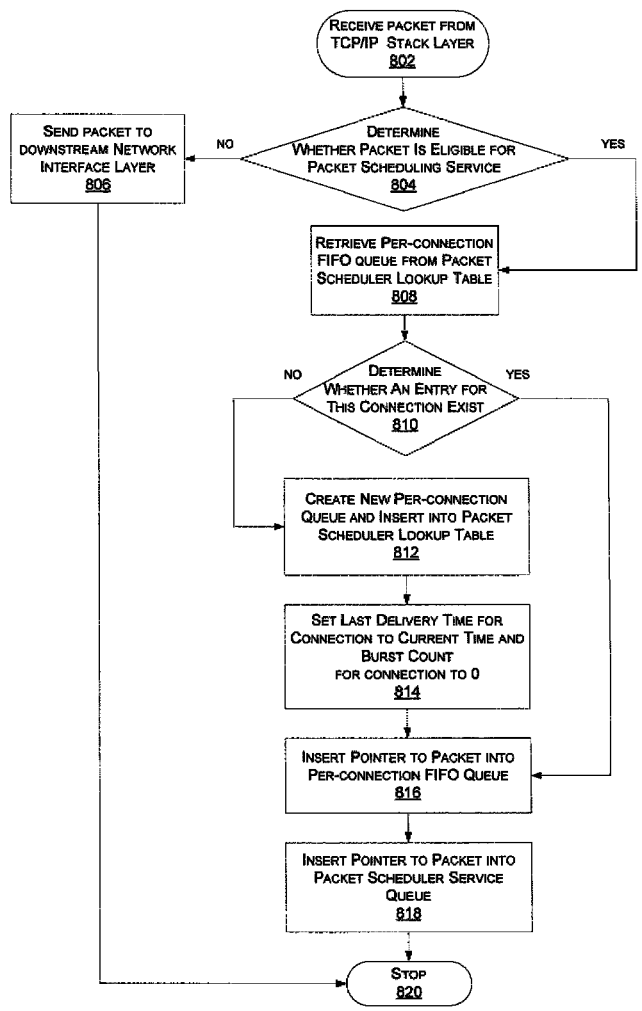
FIG. 8 is a flowchart representing an exemplary method for processing outgoing packets.

FIG. 8 is a flowchart representing an exemplary method for processing outgoing packets. It will be readily appreciated by one of ordinary skill in the art that the illustrated procedure can be altered to delete steps or further include additional steps.

After receiving (802) a TCP packet from the TCP/IP Stack Layer, a Packet Scheduler Layer determines whether the TCP packet is eligible for a packet scheduling service, for example, by checking (804) whether the TCP packet is a TCP data packet. If the packet is not eligible for the packet scheduling service, for example, when the TCP packet is not a TCP data packet, then the Packet Scheduler Layer forwards (806) the packet to the downstream Network Interface Layer. The process for this packet can then stop (820).

If the packet is eligible for the packet scheduling service, for example, when the TCP packet is a TCP data packet, the Packet Scheduler Layer retrieves (808) per-connection FIFO queue from an internal Packet Scheduler Lookup Table, and determines (810) if an entry already exists for the TCP connection. In some embodiments, the packet scheduler lookup table provides a FIFO queue that corresponds to a single connection. In some embodiments, the Packet Scheduler Lookup Table provides a FIFO queue that corresponds to multiple connections.

If an entry exists for the connection that is processed by the Packet Scheduler Layer, the Packet Scheduler Layer skips the following several steps, and inserts (816) a pointer to the packet into the per-connection FIFO queue stored in the Packet Scheduler Lookup Table, for later processing. If no entry exists for the TCP connection, then the Packet Scheduler Layer creates (812) a new per-connection FIFO queue corresponding to this TCP connection and inserts (812) the queue into the Packet Scheduler Lookup Table. The Last Delivery Time for the connection is set (814) to current time and the Burst Count for the connection is set (814) to zero. The Last Delivery Time and the Burst Count are stored into the Packet Scheduler Lookup Table. The Last Delivery Time and the Burst Count will be updated and used for processing and delivering outgoing packets to the downstream network interface layer. The details are further discussed below. After step 814, a pointer to the packet is inserted (816) into the per-connection FIFO queue stored in the Packet Scheduler Lookup Table.

After that, a pointer to the packet is also inserted (818) into the Packet Scheduler Service Queue, used by the Packet Scheduler Layer to process the pointed packets. In some embodiments, the packet itself is inserted (818) into the Packet Scheduler Service Queue for later processing. The process can then stop (820).

Figure 9:
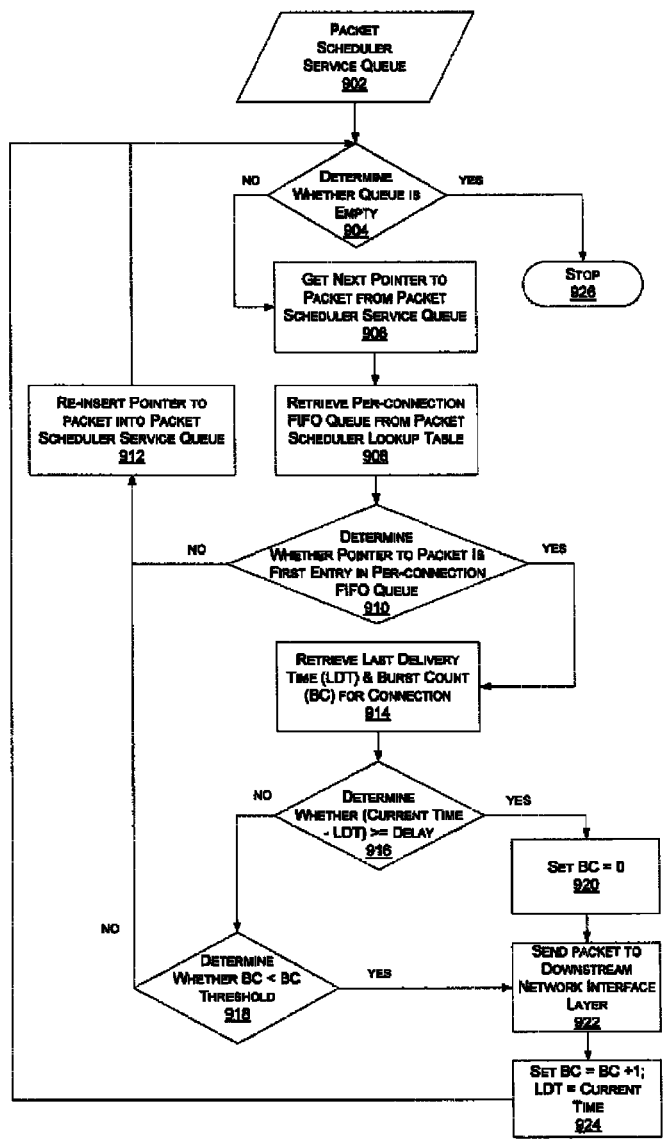
FIG. 9 is a flowchart representing an exemplary method for processing, in a packet scheduler, outgoing packets.

FIG. 9 is a flowchart representing an exemplary method for processing, in a Packet Scheduler Layer, outgoing packets. It will be readily appreciated by one of ordinary skill in the art that the illustrated procedure can be altered to delete steps or further include additional steps. As stated above, the processing of outgoing packets in a Packet Scheduler Layer may be similar to the processing of incoming packets. However, There are many differences. For example, when outgoing packets are processed by the Packet Scheduler Layer, the roles of a Network Interface Layer and a TCP/IP Stack Layer are reversed.

The Packet Scheduler Layer can invoke (902) a Packet Scheduler Service Routine to process entries in the Packet Scheduler Service Queue, through a trigger, e.g., a packet received from the TCP/IP Stack Layer or a timer that fires after a period of inactivity The Packet Scheduler Layer first checks to determine (904) if there are any entries to be processed in the Packet Scheduler Service Queue. If the Packet Scheduler Service Queue is empty, then the Packet Scheduler Service Routine terminates (926). If the Packet Scheduler Service Queue is not empty, the Packet Scheduler Layer retrieves (906) the first entry (next pointer to a packet) from the queue. The Packet Scheduler Layer also retrieves (908) from a Packet Scheduler Lookup Table information, for example, per-connection FIFO Queue, a Last Delivery Time, and a Burst Count, pertaining to the connection.

As noted earlier, for example, in FIG. 8 above, the Packet Scheduler Lookup Table stores a per-connection FIFO queue which has pointers to packets that have been buffered at the Packet Scheduler Layer. The Packet Scheduler Layer determines (910) whether the current packet being processed is the first entry in the per-connection FIFO queue. If it is not the first packet in the per-connection FIFO queue, it is simply put back (912) in the Packet Scheduler Service Queue for later processing. Processing continues by starting from step 904 once again. This ensures that the packet ordering is maintained for a given connection.

If packet is the first packet in the per-connection FIFO queue, then the Packet Scheduler Layer retrieves (914) the Last Delivery Time and the Burst Count for that connection are retrieved (914) from the Packet Scheduler Lookup Table. The Packet Scheduler Layer computes the time interval between the current time and the Last Delivery Time for that connection, and checks (916) against a pre-configured delay time, set automatically by the system or set by an administrator.

If the time interval is less than the pre-configured delay time, then this packet is a candidate for delayed delivery to the downstream Network Interface Layer. In this case, the Packet Scheduler Layer checks (918) the Burst Count for this connection against a pre-configured burst count threshold, set automatically by the system or set by an administrator. If the Burst Count is less than the pre-configured burst count threshold, the Packet Scheduler Layer delivers (922) the packet to the downstream Network Interface Layer. Then, the Packet Scheduler Layer updates (924) the Last Delivery Time to be equal to the current time and increments (924) the Burst Count by one. Incrementing the Burst Count will eventually make the Burst Count reach the pre-configured burst count threshold in the following rounds of processing thus be delivered (922) to the downstream Network Interface Layer. After set step 924, the method proceeds to step 904. If the Burst Count is greater than the pre-configured burst count threshold, then the Packet Scheduler Layer delays delivering the packet to the downstream Network Interface Layer by simply re-inserting (912) the pointer to the packet into the Packet Scheduler Service Queue, and keeping the packet in the buffer at the Packet Scheduler Layer. In some embodiments, the packet itself is re-inserted (912) into the Packet Scheduler Service Queue for later processing.

If the time interval between the current time and the Last Delivery Time for that connection is greater than or equal to the pre-configured delay threshold, the Packet Scheduler Layer sets (920) the Burst Count for the connection to zero and delivers (922) the packet to the downstream Network Interface Layer. Then, the Packet Scheduler Layer updates (924) the Last Delivery Time to be equal to the current time and increments (924) the Burst Count by one. Processing continues by starting from step 904 once again.

The methods disclosed herein may be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand alone program or as a module, component, subroutine, or other unit suitable for use in a computing environment. A computer program can be deployed to be executed on one computer or on multiple computers at one site or distributed across multiple sites and interconnected by a communication network.

In the preceding specification, the invention has been described with reference to specific exemplary embodiments. It will however, be evident that various modifications and changes may be made without departing from the broader spirit and scope of the invention as set forth in the claims that follow. The specification and drawings are accordingly to be regarded as illustrative rather than restrictive sense. Other embodiments of the invention may be apparent to those skilled in the art from consideration of the specification and practice of the invention disclosed herein.

What is claimed is:

1. A computer-implemented method performed at a packet scheduler layer on a first device, wherein the packet scheduler layer is between a network interface layer and a transport layer, the method comprising:
    receiving a transmission control protocol (TCP) packet from a sending layer on the first device, wherein the sending layer is one of the network interface layer or the transport layer and the TCP packet was sent over a connection between the first device and a second device;
    storing, at the first device, information about the connection between the first device and the second device, the information including a last packet delivery time for the connection;
    determining whether the TCP packet is part of a bursty transmission on the connection by ascertaining that a burst count of the connection is greater than a burst-count threshold;
    calculating a delay time for the connection using the last packet delivery time after determining that the TCP packet is part of a bursty transmission;
    delaying delivering the TCP packet to a receiving layer based on the calculated delay time, wherein the receiving layer is one of the network interface layer or the transport layer that is not the sending layer; and
    sending the TCP packet to the receiving layer.

2. The method of claim 1, wherein the first device is a computer Server.

3. The method of claim 1, wherein the TCP packet is a TCP acknowledgement packet generated by the sending layer on the first device.

4. The method of claim 1, wherein TCP packet is a re-transmission of a lost TCP packet re-sent by the sending layer on the first device.

5. The method of claim 1, wherein the first device communicates with a second device through a connection between the first device and the second device.

6. The method of claim 5, wherein the second device is a mobile device.

7. The method of claim 5, wherein the TCP packet originates from the second device.

8. The method of claim 5 further comprising:
    determining whether the TCP packet is eligible for the delayed delivering to the receiving layer.

9. The method of claim 8, wherein determining whether the TCP packet is eligible for the delayed delivering to the receiving layer s based on a TCP acknowledgement flag of the TCP packet being sent.

10. The method of claim 8, wherein determining whether the TCP packet is eligible for the delayed delivering to the receiving layer is based on a DATA flag of the TCP packet being sent.

11. The method of claim 8 further comprising sending the TCP packet to the receiving layer on the first device if the TCP packet is not eligible for the TCP packet scheduling service.

12. The method of claim 8, wherein the stored information about the connection between the second device and the first device further comprises:
    the burst count for the connection; and
    a per-connection first-in-first-out (FIFO) queue storing a pointer to the at least one of the one or more TCP packets not yet to be delivered to the receiving layer.

13. The method of claim 12, wherein the last packet delivery time for the connection is set to current time and the burst count for the connection is set to zero if the TCP packet is a first packet for the connection received from the sending layer.

14. The method of claim 12 further comprising:
    inserting the TCP packet in a TCP packet scheduling service queue for delaying delivering to the receiving layer.

15. The method of claim 14 further comprising:
    obtaining a next delayed TCP packet from the TCP packet scheduling service queue;
    retrieving the stored information about the connection between the first device and the second device;
    determining whether the next delayed TCP packet is a first to be delivered packet for the connection, based on the retrieved information about the connection; and
    sending the next delayed TCP packet to a receiving layer on the first device if the next delayed TCP packet is the first to be delivered packet for the connection and the delay time or the burst count for the connection meets a pre-configured threshold.

16. The method of claim 15, wherein obtaining a next delayed TCP packet from the TCP packet scheduling service queue can be invoked by receiving a TCP packet from the sending layer.

17. The method of claim 15, wherein obtaining a next delayed TCP packet from the TCP packet scheduling service queue can be invoked by a timer after a pre-configured period of inactivity of receiving or sending TCP packets, at the first device, for the connection between the second device and the first device.

18. The method of claim 15 further comprising:
    updating the stored information about the connection.

19. The method of claim 18, wherein updating the information about the connection comprises:
    resetting the burst count to zero if the delay time meets the pre-configured threshold for delivering the delayed TCP packet to the receiving layer;
    incrementing the burst count by one; and
    updating the last packet delivery time to be equal to current time.

20. The method of claim 15 further comprising:
    re-inserting the next delayed TCP packet into the TCP packet scheduling service queue for later delivering to the receiving layer, if the next delayed TCP packet is not the first to be delivered packet for the connection, or the delay time and the burst count for the connection do not meet the pre-configured threshold.

21. A system comprising:
a first device being a hardware device; and
a second device configured to communicate with the first device through a connection between the first device and the second device, the second device comprising a packet scheduler layer between a network interface layer and a transport layer, wherein the packet scheduler layer:
receives a transmission control protocol (TCP) packet from a sending layer on the second device, wherein the sending layer is one of the network layer or the transport layer and the TCP packet was sent over the connection,
stores information about the connection between the first device and the second device, the information including a last packet delivery time for the connection,
determines whether the TCP packet is part of a bursty transmission on the connection by ascertaining that a burst count of the connection is greater than a burst-count threshold,
calculates a delay time for the connection using the last packet delivery time after determining that the TCP packet is part of a bursty transmission,
delays delivering the TCP packet to a receiving layer based on the calculated delay time, wherein the receiving layer is one of the network interface layer or the transport layer that is not the sending layer, and
sends the TCP packet to the receiving layer.

22. The system of claim 21, wherein the TCP packet is a TCP acknowledgement packet generated by the sending layer on the second device.

23. The system of claim 21, wherein the TCP packet is a re-transmission of a lost TCP packet re-sent by the sending layer on the second device.

24. The system of claim 21, wherein the TCP packet originates from the first device.

25. The system of claim 21, wherein the packet scheduler layer determines whether the TCP packet is eligible for the delayed delivering to the receiving layer.

26. The system of claim 25, wherein the packet scheduler layer determines whether the TCP packet is eligible for the delayed delivering to the receiving layer based on a TCP acknowledgement flag of the TCP packet being set.

27. The system of claim 25, wherein the packet scheduler layer determines whether the TCP packet is eligible for the delayed delivering to the receiving layer based on a TCP DATA flag of the TCP packet being sent.

28. The system of claim 25, wherein the packet scheduler layer sends the TCP packet to the receiving layer on the first device immediately if the TCP packet is not eligible for the delayed delivering.

29. The system of claim 25, wherein the stored information about the connection between the first device and the second device further comprises:
the burst count for the connection; and
a per-connection first-in-first-out (FIFO) queue storing a pointer to the TCP packet not yet to be delivered to the receiving layer.

30. The system of claim 29, wherein the last packet delivery time for the connection is set to current time and the burst count for the connection is set to zero if the TCP packet is a first packet for the connection received from the sending layer.

31. The system of claim 25, wherein the packet scheduler layer inserts the TCP packet in a TCP packet scheduling service queue for delaying delivering to the receiving layer.

32. The system of claim 31, wherein the packet scheduler layer:
obtains a next delayed TCP packet from the TCP packet scheduling service queue;
retrieves the stored information about the connection between the first device and the second device,
determines whether the next delayed TCP packet is a first to be delivered packet for the connection, based on the retrieved information about the connection; and
sends the next delayed TCP packet to a receiving layer on the second device if the next delayed TCP packet is the first to be delivered packet for the connection and the delay time or the burst count for the connection meets a pre-configured threshold.

33. The system of claim 32, wherein the packet scheduler layer obtains a next delayed TCP packet from the TCP packet scheduling service queue when receiving a TCP packet from the sending layer.

34. The system of claim 32, wherein the packet scheduler layer obtains a next delayed TCP packet from the TCP packet scheduling service queue after a pre-configured period of inactivity of receiving or sending TCP packets, at the second device, for the connection between the second device and the first device.

35. The system of claim 32, wherein the packet scheduler layer updates the stored information about the connection.

36. The system of claim 35, wherein the packet scheduler layer updates the stored information about the connection by
resetting the burst count to zero if the delay time meets the pre-configured threshold for delivering the delayed TCP packet to the receiving layer;
incrementing the burst count by one; and
updating the last packet delivery time to be equal to current time.

37. The system of claim 32, wherein the packet scheduler layer:
re-inserts the next delayed TCP packet into the TCP packet scheduling service queue for later delivering to the receiving layer, if the next delayed TCP packet is not the first to be delivered packet for the connection, or the delay time and the burst count for the connection do not meet the pre-configured threshold.

38. A non-transitory computer readable medium storing instructions that, when executed by a first device, cause the first device to perform a method at a packet scheduler layer on the first device, wherein the packet scheduler layer is between a network interface layer and a transport layer, the method comprising:
receiving a transmission control protocol (TCP) packet from a sending layer on the first device, wherein the sending layer is one of the network interface layer or the transport layer and the TCP packet was sent over a connection between the first device and a second device;
storing, at the first device, information about the connection between the first device and the second device, the information including a last packet delivery time for the connection;
determining whether the TCP packet is part of a bursty transmission on the connection by ascertaining that a burst count of the connection is greater than a burst-count threshold;
calculating a delay time for the connection using the last packet delivery time after determining that the TCP packet is part of a bursty transmission;
delaying delivering the TCP packet to a receiving layer based on the calculated delay time,
wherein the receiving layer is one of the network interface layer or the transport layer that is not the sending layer; and
sending the TCP packet to the receiving layer.

* * * * *